United States Patent
Iu

(10) Patent No.: US 10,573,013 B2
(45) Date of Patent: Feb. 25, 2020

(54) SYSTEM AND METHOD FOR RENDERING SMOOTH COLOR GRADIENTS ACROSS MULTIPLE SHAPES

(71) Applicant: Christopher Ming-Yee Iu, Toronto (CA)

(72) Inventor: Christopher Ming-Yee Iu, Toronto (CA)

(*) Notice: Subject to any disclaimer, the term of this patent is extended or adjusted under 35 U.S.C. 154(b) by 143 days.

(21) Appl. No.: 15/869,386

(22) Filed: Jan. 12, 2018

(65) Prior Publication Data

US 2018/0204337 A1 Jul. 19, 2018

Related U.S. Application Data

(60) Provisional application No. 62/446,642, filed on Jan. 16, 2017.

(51) Int. Cl.
| | |
|---|---|
| *G06K 9/00* | (2006.01) |
| *G06T 7/40* | (2017.01) |
| *G06F 17/17* | (2006.01) |
| *G06T 11/40* | (2006.01) |
| *G06T 11/00* | (2006.01) |

(52) U.S. Cl.
CPC ............ *G06T 7/40* (2013.01); *G06F 17/17* (2013.01); *G06T 11/40* (2013.01); *G06T 11/001* (2013.01)

(58) Field of Classification Search
None
See application file for complete search history.

(56) References Cited

U.S. PATENT DOCUMENTS

| | | | | |
|---|---|---|---|---|
| 2004/0164992 | A1* | 8/2004 | Gangnet | G06T 11/001 345/591 |
| 2006/0284880 | A1* | 12/2006 | Zhou | G06T 15/04 345/582 |
| 2013/0127856 | A1* | 5/2013 | Winnemoeller | G06T 17/20 345/423 |

OTHER PUBLICATIONS

Boyé, Barla, and Guennebaud. "A Vectorial Solver for Free-form Vector Gradients". ACM Trans. Graph. 31, 6, Nov. 2012.
Carlsson. "Sketch Based Coding of Grey Level Images". Signal Process. 15, 1, Jul. 1988.
Finch, Snyder, Hoppe. "Freeform Vector Graphics with Controlled Thin-plate Splines". ACM Trans. Graph. 30, 6, Dec. 2011.
Floater. "Mean Value Coordinates". Comput. Aided Geom. Des. 20, 1, Mar. 2003.
Orzan, Bousseau, Winnemöller, Barla, Thollot, Salesin. "Diffusion Curves: A Vector Representation for Smooth-shaded Images". ACM Trans. Graph. 27, 3, Aug. 2008.
Sun, Liang, Wen, Shum. "Image Vectorization Using Optimized Gradient Meshes". ACM Trans. Graph. 26, 3, Article 11, Jul. 2007.

* cited by examiner

*Primary Examiner* — Hadi Akhavannik
(74) *Attorney, Agent, or Firm* — Christopher D. Heer; Heer Law

(57) ABSTRACT

The present invention provides a system and method for rendering a smooth gradient of colors across a boundary surface of two or more shapes by creating a polygon mesh representation of the surface of the two or more shapes and rendering the mesh for display such that the curvature of colors is minimized across the mesh.

12 Claims, 10 Drawing Sheets

FIGURE 1  100

Step 101: Creating a closed path outline for each of a first shape and a second shape with straight lines or curved lines Step 102: Specifying colors for nodes between the straight lines or the curved lines of the closed path outline Step 103: Specifying the blending of the colors across the boundary between the first shape and the second shape Step 104: Determining a triangle size for the triangle mesh into which the first and second shape will be decomposed Step 105: Converting all curved lines of the closed path outline into straight lines Step 106: Subdividing straight lines to be proportional to the desired triangle size Step 107: Assigning colors to new nodes between newly converted straight lines using interpolation Step 108: Creating uniform triangles by generating a grid composed of squares inside the first shape and the second shape Step 109: Splitting each square of the grid in half to create two triangles Step 110: Triangulating the space between the grid and the closed path outline of the first shape and the second shape using polygon triangulation Step 111: Splitting diagonal edges connecting two points from the closed path outline of the first shape and the second shape that were not directly connected to each other originally into two, creating two new triangles in the triangle mesh Step 112: Constructing an equation for each point of the triangle mesh to minimize the curvature of colors and a set of equations for all the points in the triangle mesh to form a system of linear equations that are solved to find a coloring for all the points in the triangle mesh Step 113: Solving the system of linear equations using iterative successive relaxation wherein at each iteration, the color of each point is clamped to be within the range of colors of neighboring points

Minimize $\sum_{adjacent\ edges}$ (*square of x and y gradient derivative differences*)

$+ \sum_{opposite\ edges}$ (*square of x and y gradient derivative differences*)

520

$\therefore 0 = \sum_{adjacent\ edges} \dfrac{\partial(\textit{square of x and y gradient derivative differences})}{\partial(color)}$ $+ \sum_{opposite\ edges} \dfrac{\partial(\textit{square of x and y gradient derivative differences})}{\partial(color)}$

FIGURE 6

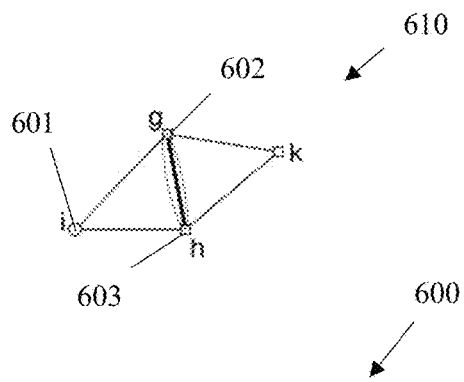

$$\frac{y_g - y_h}{A_1}\left(\frac{C_i}{2A_1}(y_g - y_h) + \frac{C_g}{2A_1}(y_h - y_i) + \frac{C_h}{2A_1}(y_i - y_g) - \frac{C_k}{2A_2}(y_h - y_g) - \frac{C_h}{2A_2}(y_g - y_k) - \frac{C_g}{2A_2}(y_k - y_h)\right)$$

$$+ \frac{x_h - x_g}{A_1}\left(\frac{C_i}{2A_1}(x_h - x_g) + \frac{C_g}{2A_1}(x_i - x_h) + \frac{C_h}{2A_1}(x_g - x_i) - \frac{C_k}{2A_2}(x_g - x_h) - \frac{C_h}{2A_2}(x_k - x_g) - \frac{C_g}{2A_2}(x_h - x_k)\right)$$

where $A_1 = \frac{1}{2}\left(x_i(y_g - y_h) + x_g(y_h - y_i) + x_h(y_i - y_g)\right)$ $A_2 = \frac{1}{2}\left(x_g(y_k - y_h) + x_k(y_h - y_g) + x_h(y_g - y_k)\right)$ $C_p$ = color at point $p$ $x_p$ = x-coordinate of point $p$ $y_p$ = y-coordinate of point $p$

FIGURE 7

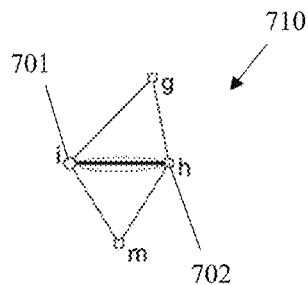

701
710
702

700

$$\left(\frac{y_g - y_h}{A_1} - \frac{y_h - y_m}{A_3}\right)\left(\frac{C_g}{2A_1}(y_h - y_i) + \frac{C_h}{2A_1}(y_i - y_g) + \frac{C_i}{2A_1}(y_g - y_h) - \frac{C_m}{2A_3}(y_i - y_h) - \frac{C_i}{2A_3}(y_h - y_m) - \frac{C_h}{2A_3}(y_m - y_i)\right)$$

$$+ \left(\frac{x_h - x_g}{A_1} - \frac{x_m - x_h}{A_3}\right)\left(\frac{C_g}{2A_1}(x_i - x_h) + \frac{C_h}{2A_1}(x_g - x_i) + \frac{C_i}{2A_1}(x_h - x_g) - \frac{C_m}{2A_3}(x_h - x_i) - \frac{C_i}{2A_3}(x_m - x_h) - \frac{C_h}{2A_3}(x_i - x_m)\right)$$

where $A_1 = \frac{1}{2}\left(x_i(y_g - y_h) + x_g(y_h - y_i) + x_h(y_i - y_g)\right)$ $A_3 = \frac{1}{2}\left(x_i(y_h - y_m) + x_h(y_m - y_i) + x_m(y_i - y_h)\right)$

SYSTEM AND METHOD FOR RENDERING SMOOTH COLOR GRADIENTS ACROSS MULTIPLE SHAPES

FIELD OF THE INVENTION

The present specification relates generally to color gradients, and more specifically relates to a system and method for rendering a smooth gradient of colors across a surface of two or more shapes.

BACKGROUND OF THE INVENTION

Vector graphics editing is a widely-used method of creating images. One significant element of vector graphics editing is creating color gradients, as smooth color gradients are often important in creating realistic images. A color gradient may be a smooth blending of shades from light to dark, dark to light, or one color to another color across a surface of an object.

To create smooth gradients, currently available methods often require complex finite element methods (FEM) or boundary element methods (BEM) using biharmonic systems. However, these methods are not always adequate in creating a smooth gradient of colors across seams of multiple and different shapes when those multiple and different shapes are placed together into a combined shape. To achieve a smooth color gradient using these methods, a user is often required to specify abstract parameters, such as color gradients on shape nodes.

Accordingly, there remains a need for improvements in the art.

SUMMARY OF THE INVENTION

In accordance with an aspect of the invention, there is provided a method for displaying a smooth gradient of colors across a surface of two or more shapes.

According to an embodiment of the invention, there is provided a method for creating a smooth gradient of colors across a boundary of two or more shapes, the method comprising: defining, for each of the two of more shapes, a closed path outline composed of straight lines or curved lines such that the two or more shapes share the boundary; specifying colors for nodes between the straight lines or the curved lines of the closed path outline, wherein the colors on each side of the straight line or the curved line are interpolated along the straight line or the curved line; specifying at the shared boundary how the colors are blended between the boundary of the two or more shapes such that there is a $C^1$ continuity of colors across the shared boundary; and rendering the shapes for display, wherein the colors specified along the closed path boundary are interpolated across the surface of the shape.

According to a further embodiment of the invention, there is provided a computer program product comprising: a storage medium configured to store computer-readable instructions; the computer-readable instructions including instructions for creating a smooth gradient of colors across a boundary surface of two or more shapes, the instructions comprising: defining, for each of the two of more shapes, a closed path outline composed of straight lines or curved lines such that the two or more shapes share the boundary; specifying colors for nodes between the straight lines or the curved lines of the closed path outline, wherein the colors on each side of the straight line or the curved line are interpolated along the straight line or the curved line; specifying at the shared boundary how the colors are blended between the boundary of the two or more shapes such that there is a $C^1$ continuity of colors across the shared boundary; and rendering the shapes for display, wherein the colors specified along the closed path boundary are interpolated across the surface of the shape.

According to a further embodiment of the invention, there is provided a computer vector drawing system for rendering a smooth color gradient across internal seams of a combination shape comprising: at least one input unit for accepting the combination shape, accepting a set of initial node color specifications, and accepting a request for smooth color gradients between certain seams of the combination shape, wherein the combination shape is defined by at least two component shapes, the at least two component shapes are defined by closed path outlines containing initial nodes, the closed path outlines define shared seams between the at least two component shapes, and the set of initial node color specifications define an initial color for each node; at least one system processing unit for rendering the combination shape as a mesh of simple polygons, the polygon mesh defined by the initial nodes of the closed path outlines and a set of additional rendered polygon mesh nodes inside the at least two component shapes, wherein the system processing unit is configured to assign curvature minimization equations to the colors of the nodes of the polygon mesh, and configured to solve the system of equations formed by the curvature minimization equations to determine a derived set of colors, the derived set of colors defining a color for each node of the set of rendered polygon mesh nodes; and at least one graphics processing unit for rendering the color gradient over the combination shape using the derived set of colors and the set of initial node color specifications.

Other aspects and features according to the present application will become apparent to those ordinarily skilled in the art upon review of the following description of embodiments of the invention in conjunction with the accompanying figures.

BRIEF DESCRIPTION OF THE DRAWINGS

Reference will now be made to the accompanying figures which show, by way of example only, embodiments of the invention, and how they may be carried into effect, and in which:

FIG. 1 is a flow diagram of a method for displaying a smooth gradient of colors across a surface of two or more shapes according to an embodiment of the invention;

FIG. 5 is an equation for minimizing the curvature of colors for each point according to an embodiment of the invention;

FIG. 6 is an equation for edges opposite to a point according to an embodiment of the invention;

FIG. 7 is an equation for edges adjacent to a point according to an embodiment of the invention.

Like reference numerals indicated like or corresponding elements in the drawings.

DETAILED DESCRIPTION OF THE EMBODIMENTS

Reference is now made to embodiments of the present invention, one or more of which are illustrated in the figures.

According to an embodiment as shown in FIG. 1, a method 100 may determine a smooth gradient of colors across a surface of a first shape and a second shape.

Method 100 includes drawing a first shape and a second shape by creating a closed path outline for each shape, with the first shape and the second shape sharing a boundary or seam or border, in step 101. Each closed path outline is made of lines, which may be straight lines or curved lines.

Figure 3A:
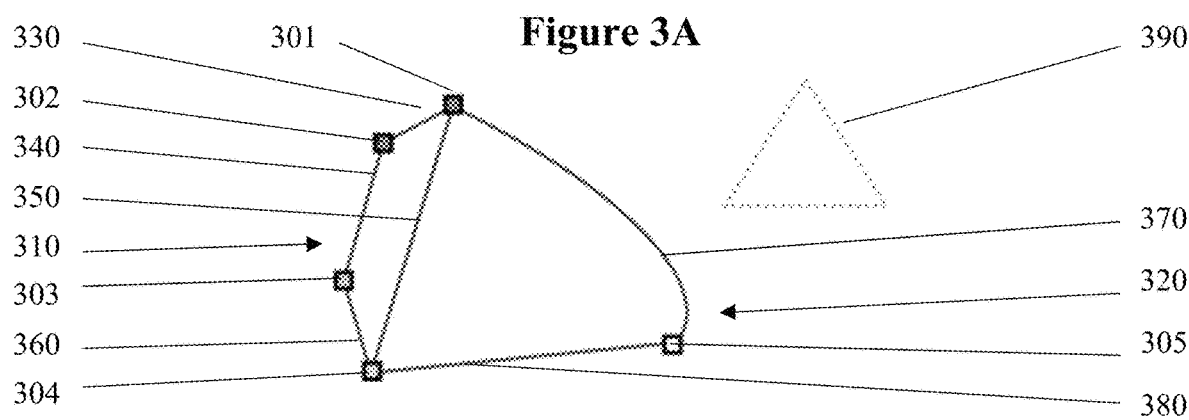
FIGS. 3A-3G are representations of example shapes following the method of FIG. 1.

An example of first and second shapes is depicted in FIG. 3A. First shape 310 is formed of lines 330, 340, 350, and 360. Second shape 320 is formed of lines 350, 370, and 380. Lines 330, 340, 350, 360, and 380 are straight lines, while line 370 is a curved line. First and second shapes 310 and 320 include a shared boundary or border or seam, being line 350. Combined shape 300 is made of component shapes 310 and 320. Combined shape 300 defines five nodes, being nodes 301, 302, 303, 304, and 305.

Method 100 also includes specifying colors for nodes between the lines forming the shapes, in step 102. With reference to FIG. 3A, colors may be specified for each of nodes 301, 302, 303, 304, and 305.

Often graphics processing units render graphics by interpolating the colors of the nodes along the lines between the nodes. The interpolation of colors over a line may be a simple linear interpolation or may be a more complex function with extra parameters, such as a Bezier curve. The colors of each shape may be blended across the surface of each shape through interpolation. Colors may be specified in red-green-blue values, UV coordinates of a texture, heights of a height map, or other scalar values.

Figure 8A:
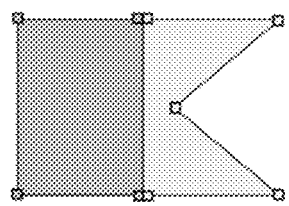
FIGS. 8A to 8C are drawings of example shapes.
Figure 8B:
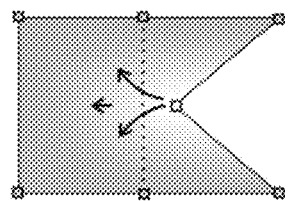
Figure 8C:
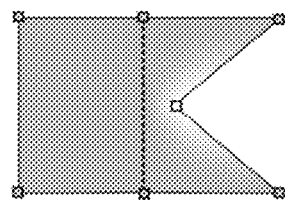

At step 103, method 100 includes specifying how colors are to be blended across the border or boundary or seam between the first and second shapes. For example, method 100 may require a user to specify how colors are to be blended over the boundary, and may accept a variety of blending instructions, including no blending, blending ignoring the boundary, or smooth blending across the boundary. FIGS. 8A to 8C show examples of the types of blending instructions that could be received. FIG. 8A shows an example of a combined shape having no blending over a boundary between component shapes, FIG. 8B shows an example of a combined shape having blending ignoring a boundary between component shapes, while FIG. 8C shows an example of a combined shape having a smooth blending over a boundary between component shapes.

For colors to blend smoothly across a shared boundary, a $C^1$ continuity of colors may be required across the shared boundary. That is, not only the color at the boundary, but also the rate of change of the colors may need to be the same on either side of the shared boundary, to avoid the appearance of a "seam" in the resulting coloration.

Figure 2A:
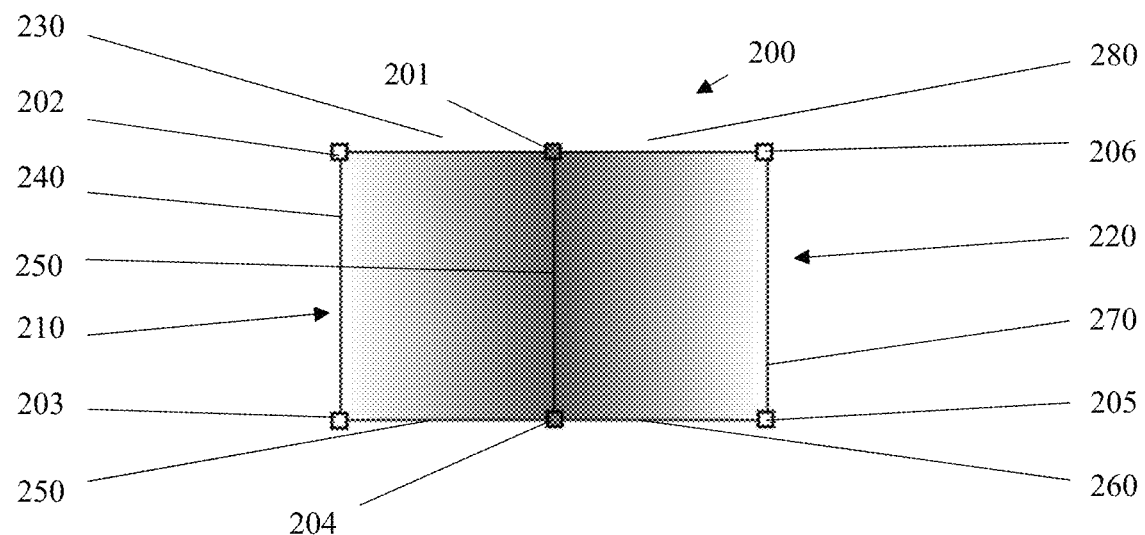
FIGS. 2A-2C are representations of a color gradient across two shapes.
Figure 2B:
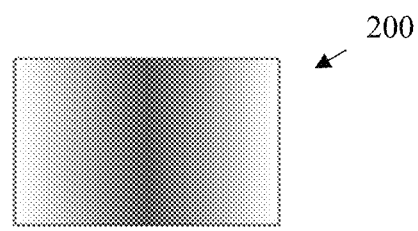
Figure 2C:
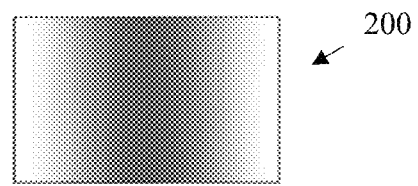

FIGS. 2A to 2C depict an example of the difference between $C^0$ and $C^1$ continuity. FIG. 2A shows that combined shape 200 is made of first and second component shapes 210 and 220. First component shape 210 is made of lines 220, 230, 240, and 250. Second component shape 220 is made of lines 250, 260, 270, and 280. Combined shape 200 defines nodes 201, 202, 203, 204, 205, and 206. Line 250 is the border or boundary or seam between first shape 210 and second shape 220. FIG. 2B shows an example of $C^0$ continuity over boundary 250, while FIG. 2C shows an example of $C^1$ continuity over boundary 250.

Although parameters, such as parameters set by a user in step 103 of method 100, may specify that the colors of a first shape may not leak into the colors of a second shape, the color gradient over the first shape may need to be influenced by the colors of the second shape and vice versa to ensure a smooth continuity of color change over the boundary. In embodiments, some of the straight lines and curved lines of a shared boundary between the first shape and second shape may be specified as requiring $C^1$ continuity across the seam in step 103. In some embodiments, the specification of a $C^1$ continuity across the seam of a shared boundary may be inferred implicitly based on whether the two shapes specify the same colors and parameters for their shared boundary.

As such, method 100 may accept as inputs, such as inputs required from a user of method 100, only three concrete specifications; a combined shape made of two or more component shapes, color specifications for each node of the combined shape, and blending specifications for each boundary between component shapes of the combined shape.

In blending color across an input shape, method 100 breaks a combined input shape into a triangle mesh across the surface of the first shape and the second shape. It is to be understood that while a triangle mesh is preferred as many graphics processing units (GPUs) are designed for use with a triangle mesh, in other embodiments any polygon mesh could be formed.

Breaking a combined input shape into a polygon mesh may involve several steps. In breaking a combined shape into a triangle mesh, method 100 starts with a step of determining an approximate size of the triangles that the first shape and the second shape are decomposed into, in step 104. This determination may be designed to break a combined shape into an evenly spaced grid of triangles internally.

Figure 3B:
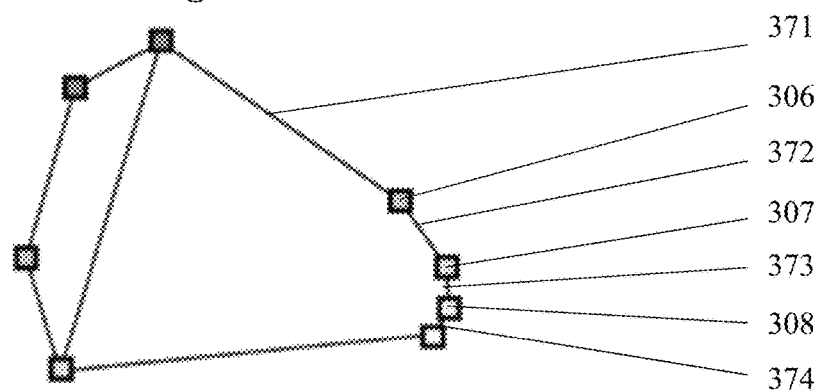

Method 100 then includes the step of converting all curved lines of the closed path outline into straight lines in step 105. FIG. 3B shows an example of converting curved line 370 of FIG. 3A into straight lines, by approximating line 370 of FIG. 3A as straight lines 371, 372, 373, and 374, separated by new nodes 306, 307, and 308. In some embodiments, all curved lines are divided such that each angle between adjacent newly formed straight lines is below a certain threshold.

Figure 3C:
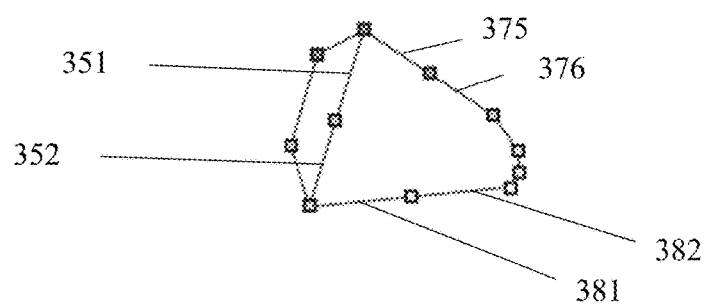

In some embodiments, as indicated at step 106 of method 100, if any straight lines are longer than a desired triangle size, the straight lines may be subdivided until proportional to the desired triangle size. In the example shown in FIG. 3C, line 350 of FIG. 3A has been broken into lines 351 and 352, line 380 of FIG. 3A has been broken into lines 381 and 382, while line 371 of FIG. 3B has been broken into lines 375 and 376.

Colors may be assigned to new nodes between newly created straight lines, such as using interpolation in step 107 of method 100 from the colors specified in step 102.

Figure 3D:
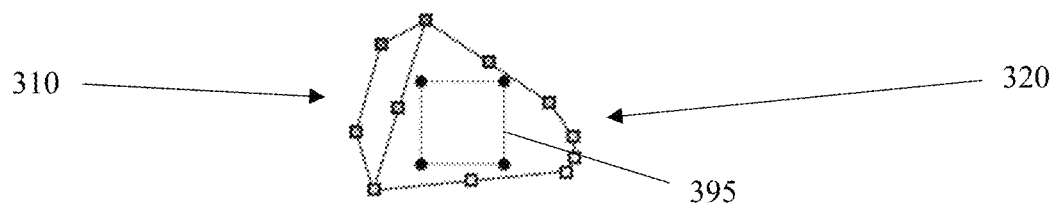

At steps 108 and 111, method 100 forms internal nodes within the component shapes of a combined shape. At step 108, method 100 converts each shape into a mesh of triangles of approximately uniform size by generating a grid composed of squares at a predetermined resolution inside the first shape and the second shape, wherein the size of the grid is proportional to the desired triangle size. An example is shown in FIG. 3D, in which the desired triangle size has resulted in a grid of squares in first and second FIGS. 310 and 320 consisting of a single square 395 in second FIG. 320. The size and position of a grid of squares may be determined in any of a variety of ways, such as using a plane-sweep algorithm.

Figure 3E:
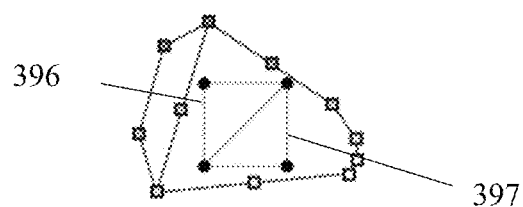

To create a grid of triangles, method 100 splits each square of the grid in half to create two triangles, in step 109. As depicted in FIG. 3E, square 395 of FIG. 3D has been split into triangles 396 and 397.

In some embodiments, instead of generating a grid of squares inside each shape and then dividing the squares to create triangles, a grid of equilateral triangles in rows may be generated where the size of each triangle is proportional to the desired triangle size. Generating a grid in this way may be slower and more complicated but may result in more uniform triangles in the mesh. Determining this grid of equilateral triangles may be done in a variety of ways, such as using a plane-sweep algorithm.

Figure 3F:
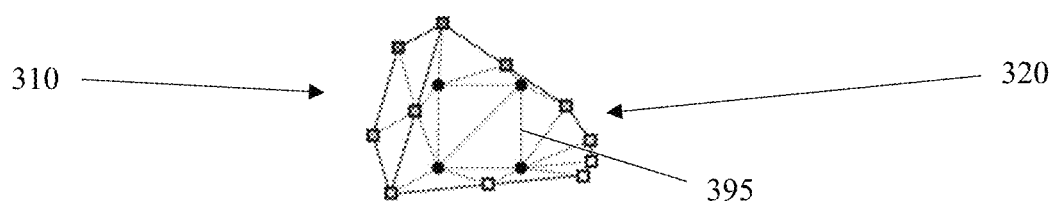

Method 100 then triangulates the space between a formed grid of squares and the closed path outlines of the first shape and the second shape, such as using a polygon triangulation algorithm, in step 110. As shown in FIG. 3F, method 100 may triangulate the space between square 395 and the path outlines of first and second shapes 310 and 320.

Figure 3G:
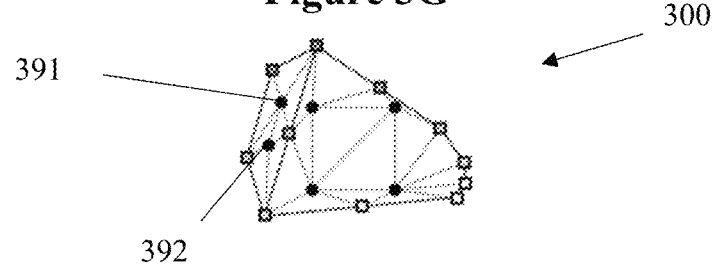

In the triangle mesh resulting from steps 101 to 110 of method 100, the triangle mesh may be defined by lines connecting nodes that were not directly connected to each other originally. At step 111, method 100 splits such lines into two by inserting a new internal node on each line, creating two new triangles in the triangle mesh. For example, as shown in FIG. 3G, two lines of FIG. 3F have been split, both at approximately the halfway point; one has been split by node 391 and the other by node 392. As shown in FIG. 3G, new internal nodes may be used to further triangulate combined shape 300. Edge splits may allow colors to travel more easily across the surface of the triangle mesh.

At step 102, the colors of the original nodes of the input combined shape were set. In the intervening steps, method 100 may have defined a number of new nodes, including new nodes on the path outline of component shapes of the combined shape and new nodes internal to the component shapes of the combined shape. Having constructed a triangle mesh representation of the input combined shape, such as combined shape 200 of FIGS. 2A to 2C and combined shape 300 of FIGS. 3A to 3G, method 100 determines a set of colors to be applied to the newly formed internal nodes.

In some embodiments, method 100 may blend the colors specified at step 102 across the additional nodes, keeping color transitions $C^1$ continuous, as discussed above.

The curvature of the colors may be minimized over the combined surface of the first shape and the second shape by minimizing changes in partial derivatives between adjacent triangles. For each point or node, method 100 constructs an equation for minimizing the curvature of colors, in step 112. Creating equations for each point in the triangle mesh results in a system of linear equations that may be solved to find a coloring for each point added by method 100 to form the triangle mesh.

Figure 4A:
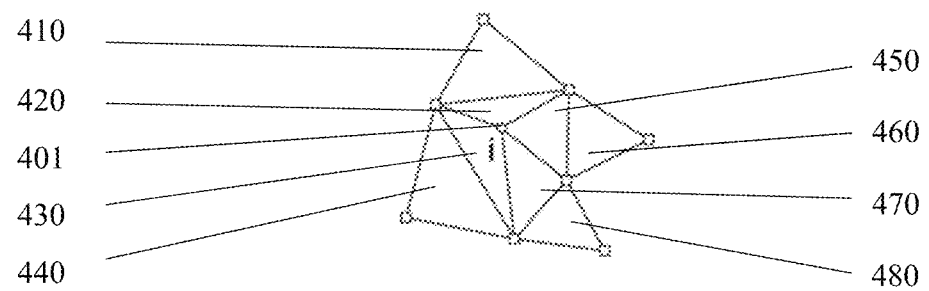
FIGS. 4A-4C are representations of example shapes with reference to a single point i.

In some embodiments, for each point, all neighboring triangles may be considered in creating an equation for a point or node. Triangles considered 'neighboring triangles' may include triangles immediately touching the point or node and triangles separated from the point or node by a single edge. For example, as depicted in FIG. 4A, each of triangles 410, 420, 430, 440, 450, 460, 470, and 480 may be considered a neighboring triangle to point i, point i being subject point or node 401.

In some embodiments, method 100 assumes that the colors of the triangles are linearly interpolated across the surface of the triangles from the three nodes defined by each triangle, as is commonly rendered by graphics processing units.

The selection of the set of triangles considered neighboring triangles may be chosen to result in $C^1$ continuous coloring, as discussed herein. As a result of the equations chosen to form the system of linear equations used to determine the color of each node, the color of one point may affect the coloring of all the triangles immediately touching the point, as well as the triangles separated from the point by a single edge.

Figure 4B:
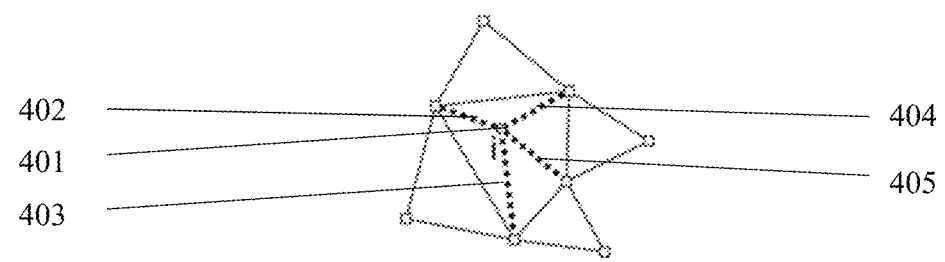
Figure 4C:
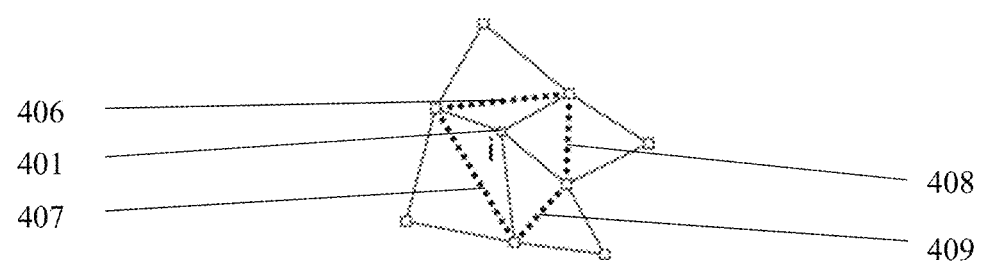

The color of each subject point or node may be chosen to minimize the difference in the gradients of colors at select affected edges. As shown in FIG. 4B, lines 402, 403, 404, and 405 join subject point 401. Where color is linearly interpolated from node to node, the color along lines 402, 403, 404, and 405 will be impacted by a change in the color of subject node 401. As shown in FIG. 4C, lines 406, 407, 408, and 409 are opposite subject point 401. Where the color of triangles touching subject point 401 change, the difference in gradients of color between those triangles and triangles opposite point 401 across lines 406, 407, 408, and 409 may also change. As such the color of subject point 401 may be chosen to minimize the differences in the gradients of colors at lines 406, 407, 408, and 409. As such, affected edges with respect to point 401 may include lines 402 to 409.

In some embodiments, minimizing the differences in the gradients of colors at this discrete selection of edges, being the affected edges as discussed with respect to FIGS. 4A to 4C, may be completed by minimizing the sum of the square of the differences in the color gradients at each edge, as indicated by equation 510 in FIG. 5. To find this minimum, the sum of the square of the differences may then be differentiated by the color of the point and its zeros may be found, as indicated by equation 520 in FIG. 5.

In some embodiments, the terms being summed take the form indicated by equations 600 and 700 in FIGS. 6 and 7, respectively. Equations 600 and 700 exemplify equations for opposite and adjoining edges, respectively. As indicated in FIG. 6, an edge joining node 601 and 603 and opposite subject node 601, as diagramed in diagram 610, may be represented by equation 600. As indicated in FIG. 7, an edge joining subject node 701 and adjacent node 702, as diagramed in diagram 710, may be represented by equation 700. For each point, the terms for adjacent and opposite edges may be summed together and set to zero to form a single equation. In some embodiments, the terms for the adjacent and opposite edges may also be weighted to partially compensate for non-uniformity in the triangle mesh.

The equations formed by all the points of the triangle mesh may be a system of linear equations with only color values as variables. Method 100 solves the system of linear equations using an iterative successive relaxation approach, in step 113. The solution of the system of linear equations gives color values for all the points in the triangle mesh, producing a smooth color blend and reducing the curvature of colors across the first shape and the second and between the first shape and the second shape. Forming equations for each node, including the initial nodes such as nodes 301, 302, 303, 304, and 305 of combined shape 300 as depicted in FIG. 3A, and setting the value of the equations for the initial nodes to the color values set at step 102 and step 107 allows the system of linear equations to be solved for the color values of each node in the mesh.

Figure 9:
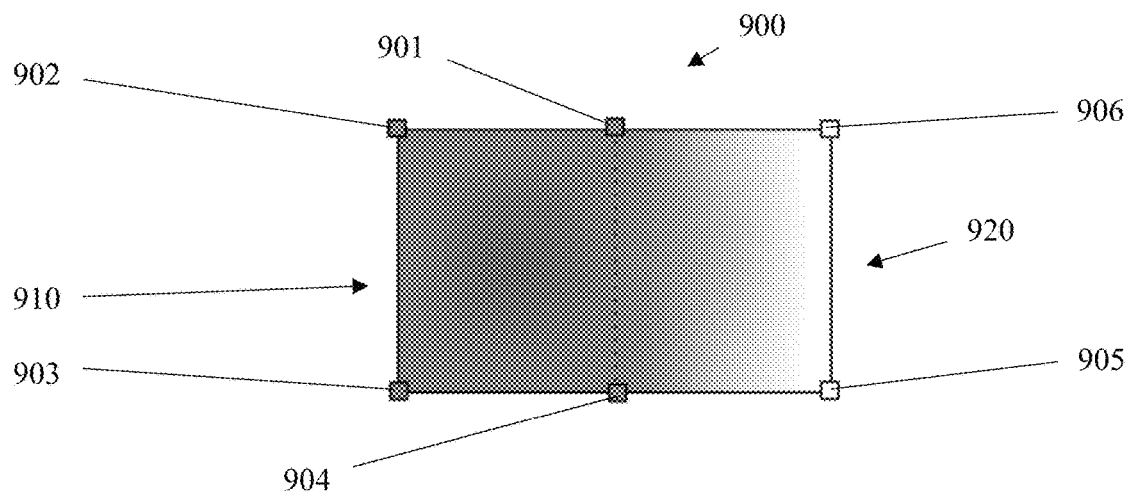
FIG. 9 is a drawing of an example shape.

In some embodiments, solving the resulting system of linear equations may result in a color artifact, such as assigning colors to certain of the nodes that are outside the range of colors defined for the initial nodes. For example, as indicated in FIG. 9, where combined shape 900 consists of component shapes 910 and 920, solving a system of linear equations may result in the color in the center of component shape 910 outside the range of colors defined on initial nodes 901, 902, 903, and 904 of component shape 910. In embodiments in which such a color artifact is not desired, the solutions to the system of linear equations may be restricted to be within the range of colors defined for the initial nodes, such as the colors assigned at step 102 of method 100. For example, when iteratively calculating the color for each point, the color may be restricted to be within the range of the colors of the immediate neighbors of the point. If the color is outside the range of the colors of the immediate neighbors of the point, the color may be clamped to be inside the range.

If the resolution of the triangle mesh is not sufficiently detailed, multigrid-like methods may be used to create a more detailed triangle mesh, whereby a smaller triangle size may first be chosen for triangulation and then the entire process may be repeated. In some embodiments, a smaller triangle size may be chosen for only some of the component shapes when repeating the process instead of using the same triangle size for all of the component shapes. The previous coloring found may be reused as an initial solution for the successive relaxation stage, which may speed up convergence of that stage of the process.

A triangle mesh of mostly uniform and regular triangles may be needed to calculate a smooth gradient, but the triangles that are displayed do not need to be uniform and regular. Triangles in the mesh may be merged to form a smaller number of larger triangles if the larger triangles have a similar coloring as the original, smaller triangles. This situation may occur if the gradient is mostly smooth except in some local areas of the mesh.

The resulting triangle mesh with defined colors at the nodes may now be rendered by graphics processing units.

Figure 10:
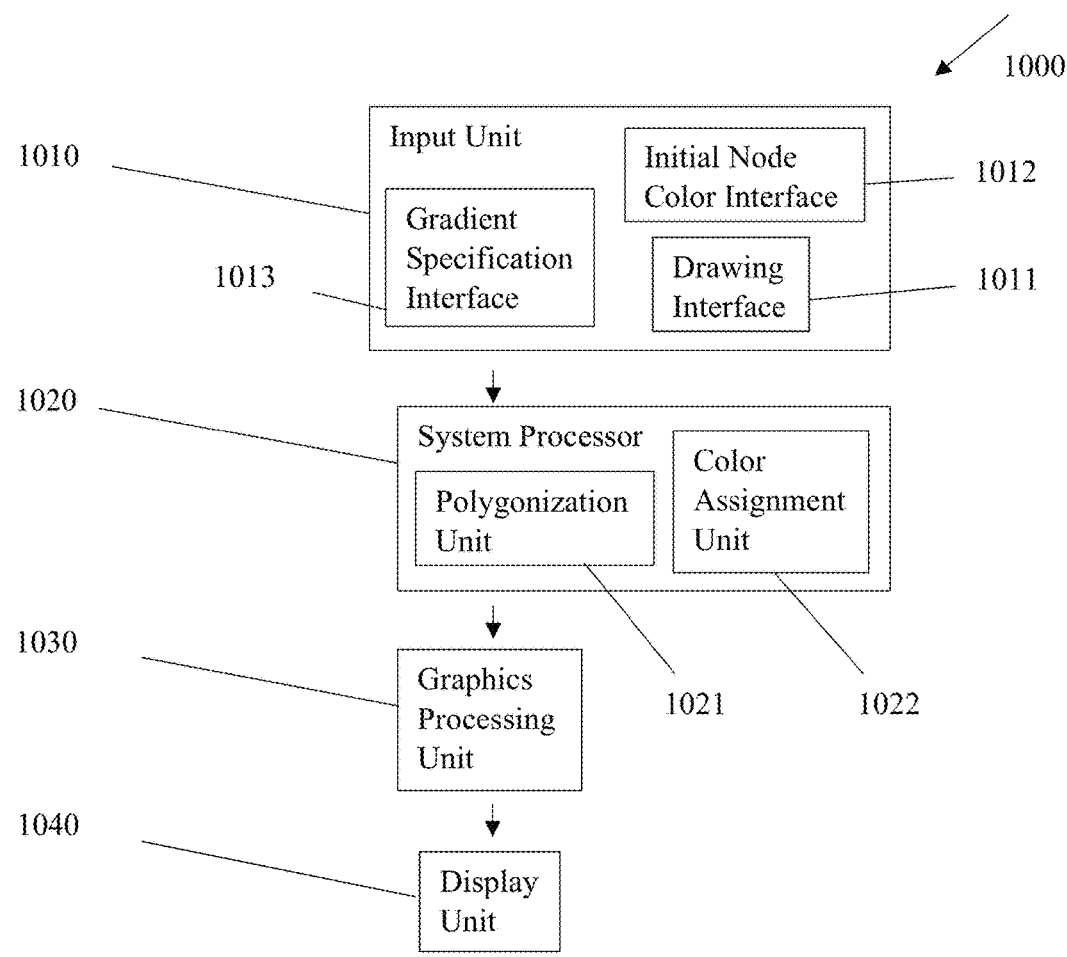
FIG. 10 is a schematic drawing of a system for creating a color gradient.

Some embodiments, as indicated in FIG. 10, a system 1000 is provided to render a smooth gradient of color across a combined shape. System 1000 includes an input unit 1010 for receiving input, such as user input, a system processor 1010 for processing input, and a graphics processing unit 1030 for rendering input, such as a combined shape received by input unit 1010. In some embodiments, system 1000 may also include a display, such as a computer monitor or other display 1040, for displaying graphics rendered by graphics processing unit 1030.

In some embodiments, input unit 1010 may include one or more input interfaces. For example, to accept a combined shape for processing, input unit 1010 may include an interface for a user to load a drawing into system 1000. Alternatively, or in addition, input unit 1010 may include a drawing interface 1011 to allow a user to draw a combined shape. Input unit 1010 may also include an initial node color interface 1012 to permit users to define the colors of the initial nodes defined by the combined shape accepted by input unit 1010. Input unit 1010 may also include a gradient specification interface 1013 to allow a user to define how system 1000 should handle graphics rendering across a boundary or seam between component shapes of a combined shape.

In some embodiments, system processor 1020 may also comprise one or more processor units or components. For example, system processor 1020 may include a polygonization unit 1021 to define a polygon mesh over a combined shape, in other embodiments polygonization unit 1021 may be a triangulation unit. System processor 1020 may also include a color assignment unit 1022 to determine the colors to be assigned to nodes of a polygon mesh representing a combined shape, such as by solving a system of linear equations representing the polygon mesh.

In some embodiments one or more of the components of system 1000 may be combined, such as graphics processing unit 1030 and system processor 1020 combined as single processor.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description and all changes which come within the meaning and range of equivalency of the claims are therefore intended to be embraced therein.

What is claimed is:

1. A method for creating a smooth gradient of colors across a boundary of two or more shapes, the method comprising:
    defining, for each of the two of more shapes, a closed path outline composed of straight lines or curved lines such that the two or more shapes share the boundary;
    specifying colors for nodes between the straight lines or the curved lines of the closed path outline, wherein the colors on each side of the straight line or the curved line are interpolated along the straight line or the curved line;
    specifying at the shared boundary how the colors are blended between the boundary of the two or more shapes such that there is a $C^1$ continuity of colors across the shared boundary; and
    rendering the shapes for display, wherein the colors specified along the closed path boundary are interpolated across the surface of the shape and wherein rendering the shapes for display is performed by;
    creating a triangle mesh of each of the shapes;
    assigning colors to points of the triangle mesh that are coincident to nodes from the closed path outline such that the points have fixed colors that are the same as those assigned to the nodes;
    assigning colors to points of the triangle mesh that are on a straight line or curved line of the closed path outline such that the points have fixed colors that are an interpolation of the colors of the nodes of either side of the straight line or curved line; and
    assigning colors to the remaining points of the triangle mesh by minimizing the local curvature of colors for each remaining point with respect to its neighboring points and to points neighboring those points, and where the assigned color is restricted to a color range based on the colors of the immediately neighboring points.

2. The method of claim 1, wherein the triangle mesh is created by:
    determining a desired size of triangles into which the shapes will be decomposed;
    converting curved lines of the closed path outline into multiple straight lines;
    subdividing straight lines of the closed path outline such that they have a maximum length proportional to the desired triangle size;

generating a grid composed of squares inside the shapes, and wherein each square of the grid is split in half to create two triangles and wherein the size of the grid is proportional to the desired triangle size;

triangulating the space between the grid and the closed path outline of the two or more shapes using polygon triangulation; and refining the triangular mesh via splitting each diagonal edge that connects two points from the closed path outline of a shape that were not directly connected to each other originally to create two new triangles.

3. The method of claim 1, wherein the straight lines or curved lines of the closed path outline can be specified as not interpolating the colors of the nodes on each side of the boundary and wherein the colors from shapes of either side of the shared boundary can be interpolated across the surface of either shape.

4. The method of claim 1, wherein the steps of assigning colors use a method comprising:

coloring triangles by linear interpolation of the colors assigned to the three corners of each triangle; and assigning colors to each point to minimize the difference in color gradient derivatives between all nearby triangles.

5. The method of claim 1, wherein the steps of the method are repeated using a more detailed triangle mesh for the shapes to produce a smoother gradient.

6. The method of claim 2, wherein instead of generating a grid composed of squares, generating a grid composed of rows of equilateral triangles wherein the size of the triangles is proportional to the desired triangle size.

7. A non-transitory computer-readable medium storing computer-readable instructions thereon which when executed by a processor create a smooth gradient of colors across a boundary surface of two or more shapes, by executing steps comprising:

defining, for each of the two of more shapes, a closed path outline composed of straight lines or curved lines such that the two or more shapes share the boundary;

specifying colors for nodes between the straight lines or the curved lines of the closed path outline, wherein the colors on each side of the straight line or the curved line are interpolated along the straight line or the curved line;

specifying at the shared boundary how the colors are blended between the boundary of the two or more shapes such that there is a $C^1$ continuity of colors across the shared boundary; and rendering the shapes for display, wherein the colors specified along the closed path boundary are interpolated across the surface of the shape and wherein rendering the shapes for display is performed by:

creating a triangle mesh of each of the shapes;

assigning colors to points of the triangle mesh that are coincident to nodes from the closed path outline such that the points have fixed colors that are the same as those assigned to the nodes;

assigning colors to points of the triangle mesh that are on a straight line or curved line of the closed path outline such that the points have fixed colors that are an interpolation of the colors of the nodes of either side of the straight line or curved line, and assigning colors to the remaining points of the triangle mesh by minimizing the local curvature of colors for each remaining point with respect to its neighboring points and to points neighboring those points, and where the assigned color is restricted to a color range based on the colors of the immediately neighboring points.

8. The non-transitory computer-readable medium of claim 7, wherein the triangle mesh is created by:

determining a desired size of triangles into which the shapes will be decomposed;

converting curved lines of the closed path outline into multiple straight lines;

subdividing straight lines of the closed path outline such that they have a maximum length proportional to the desired triangle size;

generating a grid composed of squares inside the shapes, and wherein each square of the grid is split in half to create two triangles and wherein the size of the grid is proportional to the desired triangle size;

triangulating the space between the grid and the closed path outline of the two or more shapes using polygon triangulation; and refining the triangular mesh via splitting each diagonal edge that connects two points from the closed path outline of a shape that were not directly connected to each other originally to create two new triangles.

9. The non-transitory computer-readable medium of claim 7, wherein the straight lines or curved lines of the closed path outline can be specified as not interpolating the colors of the nodes on each side of the boundary and wherein the colors from shapes of either side of the shared boundary can be interpolated across the surface of each shape.

10. The non-transitory computer-readable medium of claim 7 wherein the steps of assigning colors use a method comprising:

coloring triangles by linear interpolation of the colors assigned to the three corners of each triangle; and assigning colors to each point to minimize the difference in color gradient derivatives between all nearby triangles.

11. The non-transitory computer-readable medium of claim 7 wherein the steps of the method are repeated using a more detailed triangle mesh for the shapes to produce a smoother gradient.

12. The non-transitory computer-readable medium of claim 8, wherein instead of generating a grid composed of squares, generating a grid composed of rows of equilateral triangles wherein the size of the triangles is proportional to the desired triangle size.

* * * * *